Dec. 6, 1927.

W. LEMKE

WIND MOTOR

Filed Aug. 17, 1927

William Lemke
INVENTOR

BY Victor J. Evans
ATTORNEY

WITNESS:

Dec. 6, 1927.

W. LEMKE 1,652,022

WIND MOTOR

Filed Aug. 17, 1927     4 Sheets-Sheet 2

William Lemke INVENTOR

BY *Victor J. Evans*

ATTORNEY

WITNESS:

Dec. 6, 1927.　　　　　　　　　　　　　　　　　　　　1,652,022
W. LEMKE
WIND MOTOR
Filed Aug. 17, 1927　　　　4 Sheets-Sheet 3
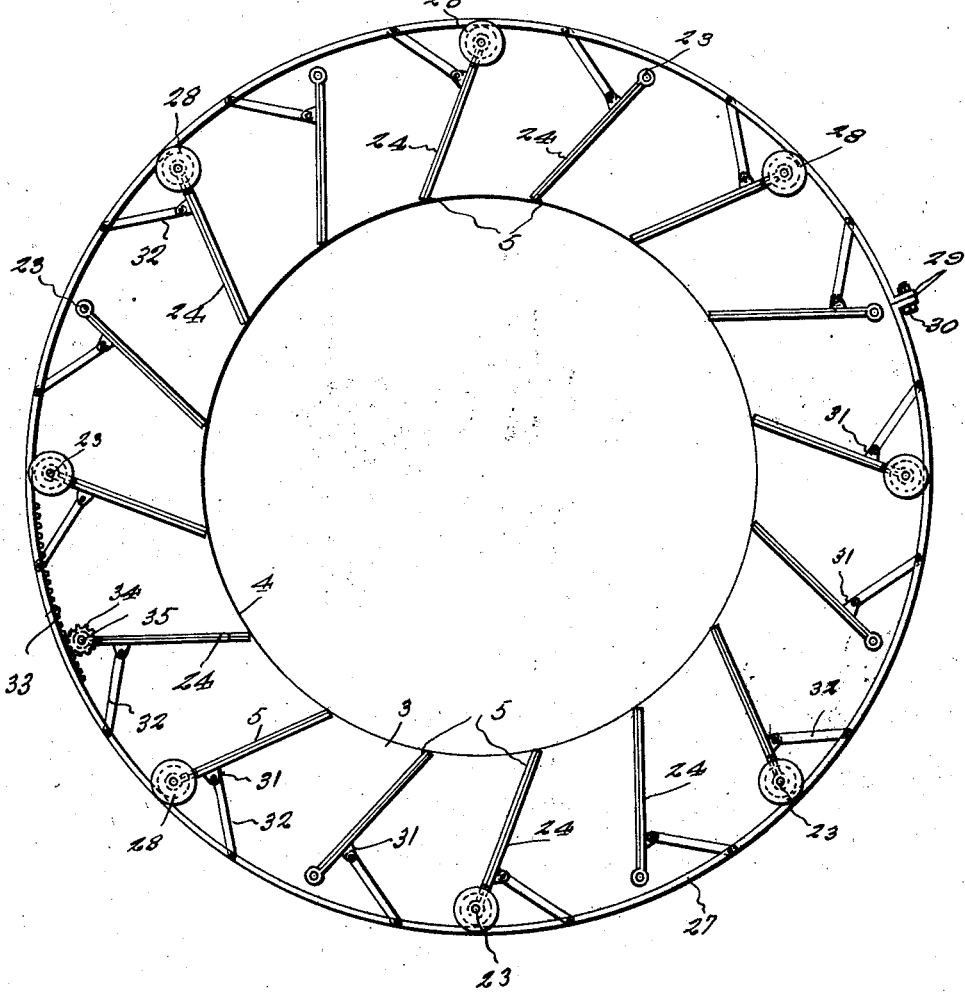
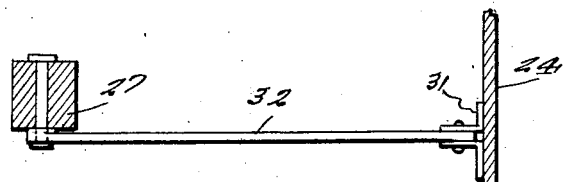
William Lemke INVENTOR Dec. 6, 1927.

W. LEMKE

WIND MOTOR

Filed Aug. 17, 1927

R. A. Thomas

WITNESS:

William Lemke INVENTOR

BY Victor J. Evans

ATTORNEY

Patented Dec. 6, 1927.

1,652,022

UNITED STATES PATENT OFFICE.

WILLIAM LEMKE, OF ST. JOSEPH, MICHIGAN.

WIND MOTOR.

Application filed August 17, 1927. Serial No. 213,605.

This invention relates to wind motors, and its general object is to provide a wind motor that includes housed wind actuated vanes that can be exposed to the wind regardless of the direction of travel thereof, and can be protected from the wind in case of severe storms and the like.

A further object of the invention is to provide a wind motor including means whereby the velocity and direction of the wind can be controlled to the wind vanes of the rotor of the motor.

Another object of the invention is to provide a wind motor that is extremely simple in construction, inexpensive to manufacture and is efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 3 is a top plan view with the top of the housing and rotor removed and includes the position of the wind guides together with the shutters which are shown in open position.

Figure 5 is a sectional view taken approximately on line 5—5 of Figure 4.

Figure 1:
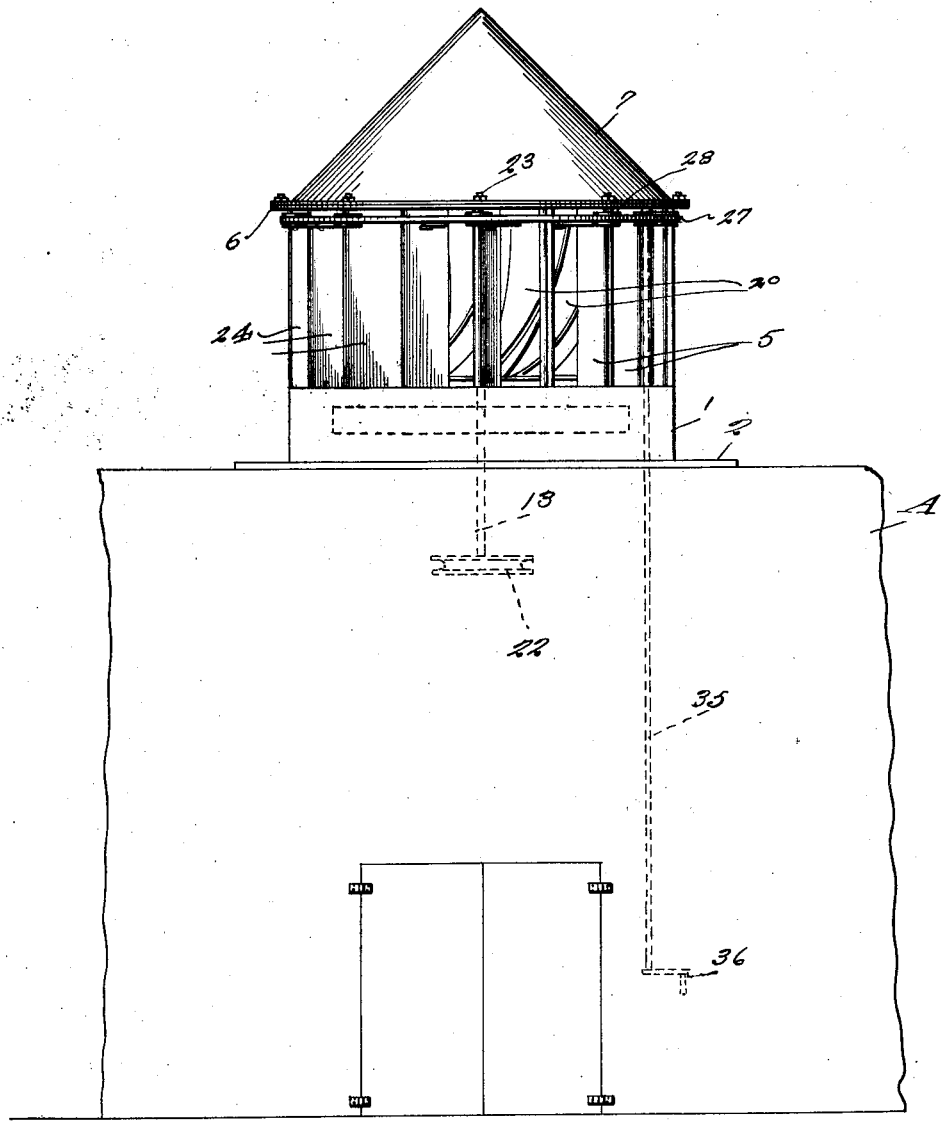
Figure 1 is a front elevation of the wind motor forming the subject matter of the present invention and showing the same mounted upon a building.

Referring to the drawings in detail and especially to Figure 1 thereof, it will be noted that I have included the wind motor which forms the subject matter of the present invention mounted upon the top of a building A, but of course it can be supported and mounted by any means and in any manner without departing from the spirit of the invention.

Figure 2:
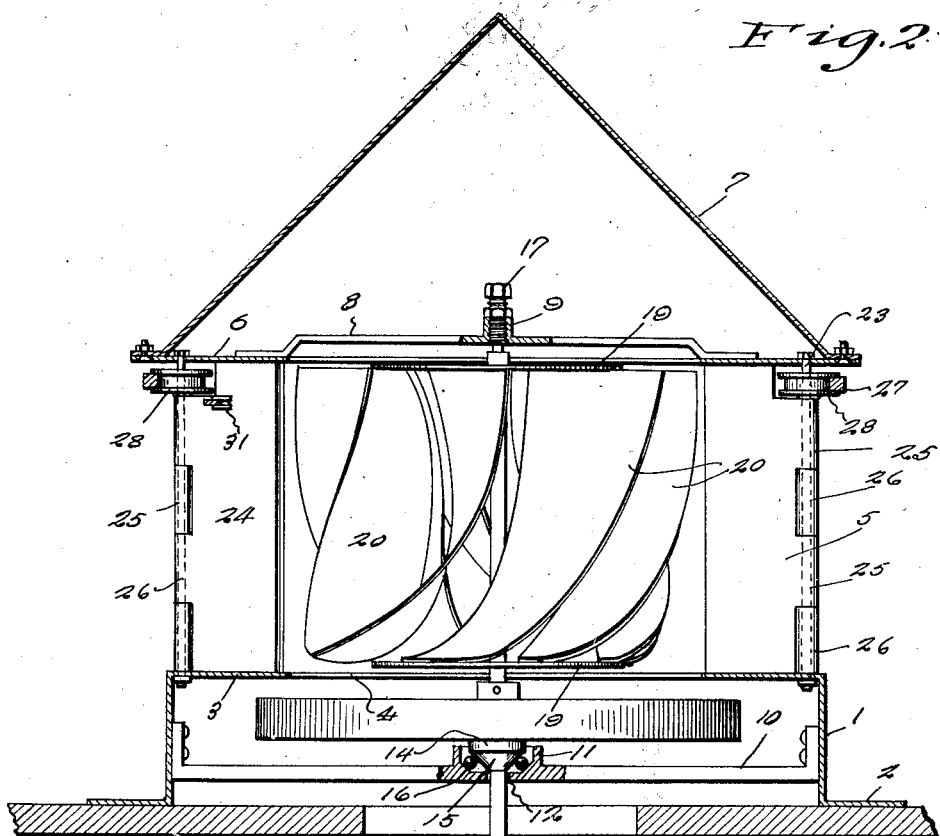
Figure 2 is a vertical sectional view taken through the motor housing and showing parts in section and in elevation.
Figure 6:
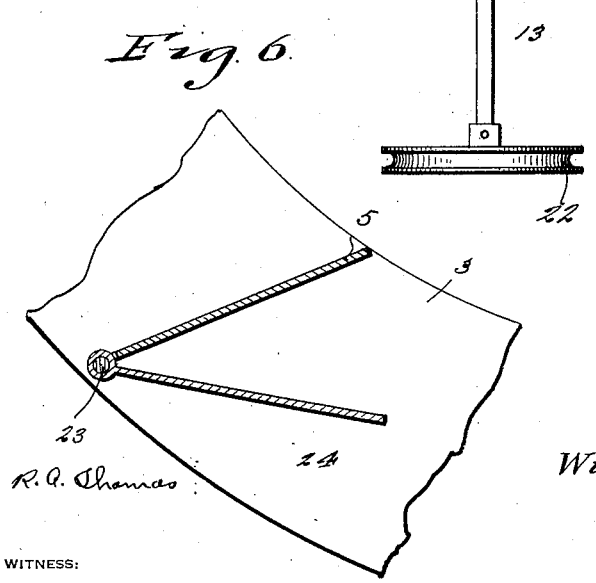
Figure 6 is a horizontal sectional view taken through one of the wind guides and shutter.

The housing includes a base portion which is provided with a circular upright wall 1 having an outwardly extending annular flange 2 formed with its lower edge so as to provide means for receiving securing means for fixing the motor to a building and the like as suggested in Figure 1 of the drawings. A top 3 is formed with the base portion and is provided with a circular opening 4 which takes up the greatest portion of the top as shown in Figure 2 of the drawings.

Fixed to the top and arranged in equidistantly spaced relation with respect to each other are vertically disposed plates 5 which are all arranged at the same inclination for a purpose which will be apparent, as these plates act in capacity of wind guides for directing the wind to the rotor which will be presently described.

Secured to the top of the plates and arranged in parallelism with the top 3 is a flat ring like member 6 having a centrally disposed opening formed therein of the same diameter as the opening 4, and mounted upon the ring like member 6 and being secured thereto adjacent its outer edge is a substantially cone shape cover 7 for the housing.

Bridging the opening in the ring like member 6 and having its ends secured upon diametrically opposite sides of the said ring like member 6 is a bracket 8 having centrally formed therewith a threaded sleeve 9. Mounted in the base portion and having its ends bent at right angles upon itself and secured to the wall 1 of the base portion is a cross piece 10 having formed centrally therein a cup 11 which is provided with an opening 12 in its bottom.

Passing through the opening 12 is the shaft 13 for the rotor and said shaft has fixed thereto a bearing collar 14 formed with a beveled lower portion 15 which follows the inclination of a portion of the inner wall of the cup 11, and disposed between the beveled portion 15 and the inclined portion of the wall of the cup are anti-friction balls 16 which support the weight of the rotor and the structure actuated thereby as will be apparent upon inspection of Figure 2 of the drawings. The upper end of the shaft 13 is associated with an adjusting screw bolt 17 which is threadedly secured in the threaded sleeve and carried by the bolt is a nut 18 for locking the bolt at varied positions in the sleeve as will be apparent.

Secured to the shaft 13 and arranged in spaced relation with respect to each other, are disks 19, to which are fixed the vanes 20 of the rotor. The vanes are of novel construction and are provided with relatively wide upper portions so that the upper edges thereof extend a considerable distance beyond the outer edge of the upper disk 19. The vanes have their outer edge inclined so as to provide the substantially tapered formation as suggested in Figure 2 of the drawings, and the vanes are each curved downwardly in the same manner and toward each other with their lower ends secured to the lower disk. Fixed to the shaft between the lower disk 19 and cup 11 is a fly wheel 21, and secured to the lower end of the shaft which of course may be any length desired, is a pulley 22 whereby power can be taken from the rotor.

Figure 4:
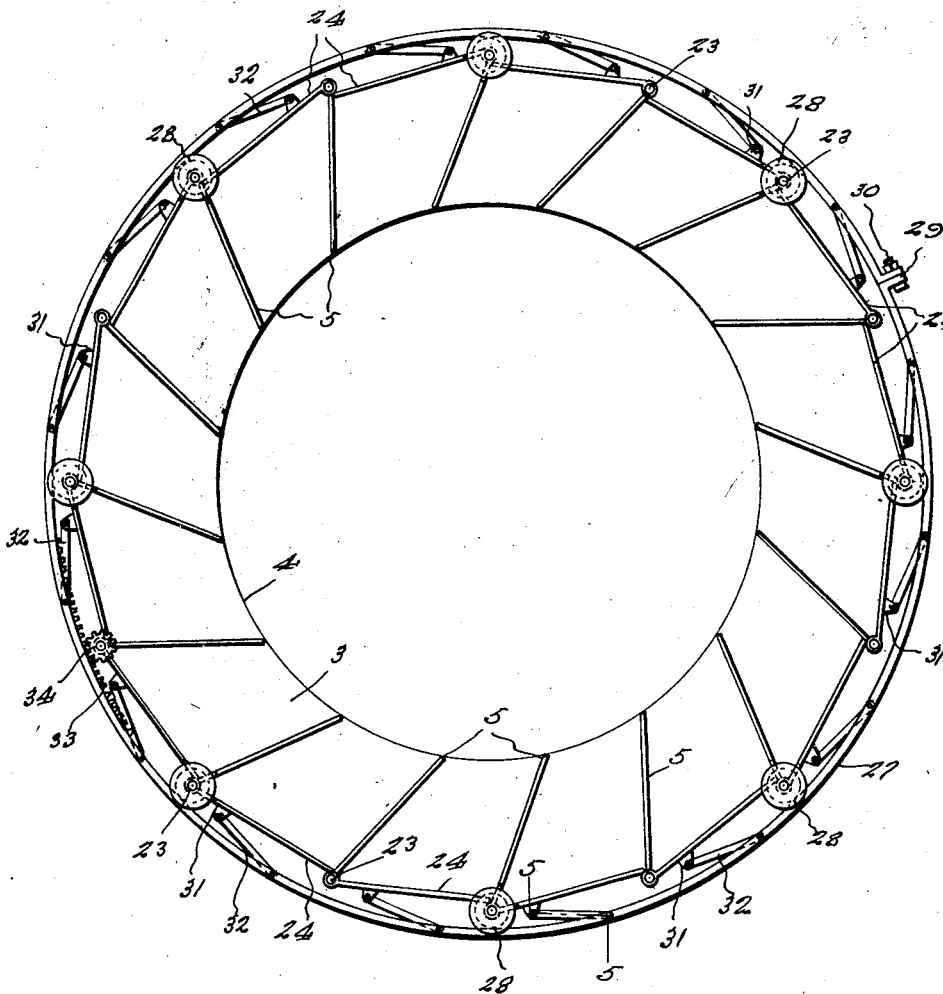
Figure 4 is a similar view with the shutters arranged in closed position.

Arranged in equi-distantly spaced relation with respect to each other and having their ends mounted in the top 3, and ring like member 6 are rods 23 which provide means for hingedly securing shutters 24 with respect to the plates 5. The plates 5 are provided with hinge barrels 25 through which passes the rods 23 and the shutters are likewise provided with barrels 26 disposed in alignment with the barrels 25 for receiving the rods 23 for rotation thereon. In order to operate the shutters, for arranging the same in their respective positions as shown in Figures 3 and 4 of the drawings or any desired position between these respective positions, I provide a hoop 27 received between the flanges of sheave wheels 28. These sheave wheels are secured to every other rod adjacent the top thereof. These wheels retain the hoop in cooperative association with the structure and said hoop is transversely split with apertured lugs 29 for receiving a bolt and nut connection 30. Extending laterally from adjacent the hinged end of each of the shutters 24 are spaced parallel apertured ears 31 which pivotally receive one of the ends of links 32, while the opposite ends of these links are pivotally secured to the hoop which has formed in its circumference and extending inwardly therefrom a plurality of teeth 33 for receiving a pinion 34 which is secured upon the upper end of a rod 35 having a crank handle 36 secured to its lower end and by this construction, it will be obvious that upon rotating the rod 35 through the medium of its crank handle 36 that the hoop will be caused to move for positioning the shutters in any desired position. The rod 35 is of course suitably supported and braced by brackets between its ends, and the length of the rod will depend upon the place where the motor is supported, as it is apparent that the crank handle must be arranged in convenient reach of the operator of the device as suggested in Figure 1 of the drawings.

Figure 7:
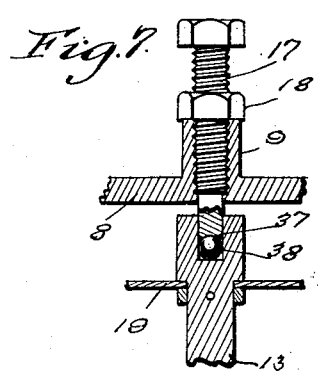
Figure 7 is a vertical sectional view taken through one of the bearings for the rotor and showing parts in elevation.

Upon inspection of Figure 7 of the drawings, it will be noted that the shaft 13 is provided with a bore 37 in its upper end to accommodate an anti-friction ball 38 as well as the restricted lower end of the screw bolt 17 which is provided with a concavity formed therein to receive the ball 38. By mounting the shaft in the bearings as shown, it will be apparent that friction will be decreased to a minimum.

From the above description and disclosure of the drawings, it will be obvious that the rotor will be arranged in the path of wind regardless of the direction of travel of the latter, and the velocity and direction of travel of the wind can be controlled to the wind vanes through the instrumentality of the shutters by merely adjusting the same as desired.

Any desired apparatus can be operated by my wind motor, but it is extremely useful for operating an electric generator, and any suitable connection can be made between the generator and the pulley 22.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A wind motor of the character described comprising a housing including a base having a top formed with an opening, a ring like member arranged in spaced relation with said top and being formed with an opening registering with the opening first mentioned, vertically disposed wind guides arranged at equi-distant spaced relation with respect to each other between the top and ring like member, shutters hingedly secured with respect to the wind guides and being adapted to be arranged in parallelism therewith or any desired angle with respect thereto, means for operating the shutters, a shaft mounted for rotation and being disposed between the wind guides, disks secured to said shaft, wind vanes secured to said disks, a fly wheel fixed to said shaft, and a pulley secured to said shaft.

2. A wind motor of the character described comprising a housing, a base portion included in said housing, a ring like member, wind guides arranged at an inclination between said ring like member and base portion, vertical rods having their ends secured in the base portion and ring like member, barrels formed with said guides and receiving said rods, shutters hingedly secured to said rods, means for operating said shutters with respect to said guides for opening or closing said housing, a rotor mounted between said guides, a shaft included in said rotor, a fly wheel secured to said shaft, and a pulley secured to said shaft.

3. A wind motor of the character described comprising a base portion, a top included in said base portion, wind guides vertically disposed and being secured to said top, a ring like member mounted upon the upper ends of said guides, said guides being arranged at an inclination and in equi-distant spaced relation with respect to each other, barrels formed with said guides, rods arranged in said barrels and having their ends secured to the ring like member and top respectively, shutters hingedly secured to said rods, ears formed with said shutters, a hoop mounted for rotation, links between said hoop and ears for operating said shutters, means for operating said hoop, a rotor mounted for rotation in said housing, and a pulley operated by said rotor.

In testimony whereof I affix my signature.

WILLIAM LEMKE.